(12) United States Patent
Genz et al.

(10) Patent No.: US 8,563,137 B2
(45) Date of Patent: Oct. 22, 2013

(54) COMPOSITE MATERIAL COMPRISING TWO OR MORE SUPERIMPOSED LAYERS OF WOODS

(75) Inventors: Manfred Genz, Ostercappeln (DE); Hans Ulrich Schmidt, Osnabrueck (DE); Stefan Ullmann, Germaringen (DE); Timo Prozeske, Stemshorn (DE); Stefan Meyer, Cloppenburg (DE)

(73) Assignee: BASF SE, Ludwigshafen (DE)

( * ) Notice: Subject to any disclaimer, the term of this patent is extended or adjusted under 35 U.S.C. 154(b) by 138 days.

(21) Appl. No.: 13/318,225

(22) PCT Filed: Apr. 26, 2010

(86) PCT No.: PCT/EP2010/055505
§ 371 (c)(1),
(2), (4) Date: Dec. 7, 2011

(87) PCT Pub. No.: WO2010/125013
PCT Pub. Date: Nov. 4, 2010

(65) Prior Publication Data
US 2012/0088098 A1    Apr. 12, 2012

(30) Foreign Application Priority Data
Apr. 30, 2009    (EP) .................................... 09159159

(51) Int. Cl.
*B32B 27/12* (2006.01)
*B32B 27/40* (2006.01)

(52) U.S. Cl.
USPC .................. 428/425.1; 428/308.8; 428/309.9; 428/311.71; 428/317.5; 428/317.7

(58) Field of Classification Search
USPC ........ 428/309.9, 311.71, 317.5, 317.7, 425.1, 428/308.8
See application file for complete search history.

(56) References Cited

U.S. PATENT DOCUMENTS

| 4,882,408 | A | 11/1989 | Blum |
| 5,955,023 | A * | 9/1999 | Ioffe et al. ..................... 264/463 |
| 2003/0108760 | A1 * | 6/2003 | Haas et al. ................. 428/537.1 |
| 2007/0088103 | A1 | 4/2007 | Poncet |
| 2007/0155859 | A1 * | 7/2007 | Song et al. ..................... 523/218 |
| 2009/0264560 | A1 * | 10/2009 | Warnes et al. .................. 524/13 |

FOREIGN PATENT DOCUMENTS

| DE | 1564 80 | 9/1982 |
| DE | 211 689 | 7/1984 |
| DE | 211 930 | 7/1984 |
| DE | 211 931 | 7/1984 |
| EP | 0 300 388 | 1/1989 |
| EP | 1 072 620 | 1/2001 |
| EP | 1 072 621 | 1/2001 |
| WO | 99 19141 | 4/1999 |
| WO | 03 054046 | 7/2003 |

OTHER PUBLICATIONS

U.S. Appl. No. 13/410,616, filed Mar. 2, 2012, Schuette, et al.
"Preferred Standards for Hardwood Plywood Floor Panels," Institute of International Container Lessors, Technical Bulletin: IICL TB 001, Total 24 Pages, (Sep. 1, 2002).
Voelkel, H-G., et al., "Mikroskopie von Fasem, Fuellstoffen und Papieren," PTS-Manuscript, PTS-MS 11/94-5, Total 30 Pages, (1994).
Abele, L., et al., "Polyurethane," Kunststoff Handbuch 7, Total 25 Pages, (1993).
International Search Report Issued Jul. 5, 2010 in PCT/EP10/055505 Filed Apr. 26, 2010.

* cited by examiner

*Primary Examiner* — Thao T. Tran
(74) *Attorney, Agent, or Firm* — Oblon, Spivak, McClelland, Maier & Neustadt, L.L.P.

(57) ABSTRACT

The invention relates to a composite material having two or more superimposed wood layers. Said layers are joined together by means of a one component polyurethane adhesive containing a prepolymer having free NCO groups and a wood having a volume fraction of libriform fibres in the region of between 50-70% is used.

20 Claims, No Drawings

COMPOSITE MATERIAL COMPRISING TWO OR MORE SUPERIMPOSED LAYERS OF WOODS

The invention relates to a composite material comprising two or more layers of a wood-like material which are arranged one on top of the other.

Composite materials have a very wide range of fields of use.

For sustainable use of resources, composite materials from renewable raw materials are particularly attractive. At present, about 800 000 m³ of tropical hard woods (in particular apitong, etc.) are used annually just for container floors, which corresponds to an area of about 560 km² (=about 3 times the area of Washington D.C.) of tropical rainforest, which are cleared for this purpose every year. Corresponding restrictions and quota fixing are already greatly limiting the availability of these timbers from tropical rainforests, so that alternative materials are being intensively sought.

US 2007/0088103 discloses a composite material which has in particular two layers which are bonded with an unfoamed polyurethane binder based on a urethane-modified isocyanate. The layers of the composite material may be lignocellulosic layers, in particular cork, wood, grass or straw.

However, the document does not describe composite materials from renewable raw materials having a low density and high mechanical load capacity and resilience.

It is known that laminated materials can be produced from wood, the individual layers being bonded to one another with phenol-formaldehyde adhesives. However, the fact that laminated materials produced with phenol-formaldehyde adhesives and comprising wood have in some cases a relatively high density of from 0.8 to 1.0 kg/l or even >1 kg/l is disadvantageous. Particularly disadvantageous, however, is the insufficient static efficiency and in particular their insufficient dynamic efficiency. This leads both to early failure due to fracture under static load (Institute of International Container Lessors (IILC), Technical Bulletin (TB) 001, Sep. 1, 2002, Short Span Test), and especially to delamination of the individual layers of laminated materials produced therefrom, which layers are adhesively bonded with phenol-formaldehyde and/or polyvinyl acetate. Such laminated materials adhesively bonded with phenol-formaldehyde also exhibit their insufficient performance particularly under elevated temperatures, for example at 80° C.

It was accordingly an object of the invention to provide a composite material which is based on a wood-like material and which has excellent mechanical and dynamic properties, in particular a high static and dynamic load capacity and high resilience, in combination with low density of substantially <1 kg/l and retains its high performance level even at elevated temperatures.

This object is achieved by a composite material comprising two or more layers of a wood which are arranged one on top of the other, the layers being bonded to one another with a one-component polyurethane adhesive comprising a prepolymer having free NCO groups, wherein the wood used has a proportion by volume of libriform fibers in the range from 50 to 70%.

It was found that a composite material based on a wood with closed loculi and having excellent mechanical and dynamic properties and at the same time a low density can be obtained by bonding layers formed from the wood with closed loculi with a one-component polyurethane adhesive comprising a prepolymer having free NCO groups.

Libriform fibers are elongated, more or less thick-walled, narrow-lumen, pointed and closed tubular cells which carry air or water.

According to Treiber (in H.-G. Völkel and J. Weigl: "Mikroskopie von Fasern, Füllstoffen and Papieren", Papiertechnische Stiftung, Munich, PTS Manuscript PTS-MS 11/94-6 (1994)), birch and aspen have almost twice as high a proportion by volume of libriform fibers as beech (given a similar vessel or tracheae volumes). (cf. table 1)

TABLE 1

Proportion of libriform fibers or tracheae (in the case of coniferous woods) in percentage by volume for different wood species

| Wood species | Tracheae or libriform fibers |
| --- | --- |
| Spruce (*Picea abies*) | 95 |
| Pine (*Pinus silvestris*) | 93 |
| Aspen (*Populus tremuloides*) | 62 |
| Birch (*Betula verrucosa*) | 65 |
| Beech (*Fagus silvatica*) | 37 |

According to the invention, woods having a high proportion by volume of libriform fibers and in particular a proportion by volume of from 50 to 70% of libriform fibers are used. These libriform fibers (closed tubular cells) are at least predominantly closed loculi, and these are also retained after adhesive bonding with a one-component polyurethane adhesive, without being penetrated by or filled with the adhesive, so that they act as an integrated air pump or an integrated air cushion in the finished composite material. It is assumed that the above relationships are responsible for the fact that a composite material having substantially improved static and dynamic properties is obtained.

These outstanding static and dynamic properties are utilized according to the invention by proposing the use of such a composite material as a structural element in building construction, civil engineering, shipbuilding, vehicle construction, aircraft construction, construction of power plants, mining or furniture construction.

The wood used in the composite material according to the invention is particularly preferably birch wood.

Further preferred woods are aspen, eucalyptus, rubber tree, silk tree, cotton tree, acacia or poplar.

The composite material according to the invention preferably has from 5 to 31 layers arranged one on top of the other.

Advantageously, a composite material can be provided, wherein one or more layers formed from a glass fiber web, a natural fiber web, a glass fiber mat or a natural fiber mat are provided in addition to the one or more layers of wood.

In addition to the one or more layers of a wood, one or more plastic layers, in particular one or more polyurethane/polyurea layers can advantageously be provided, in particular as outer layer(s).

It is also possible to surround the composite material on all sides with a plastic layer.

These additional plastic layers may comprise in particular further, organic and/or inorganic fillers, for example organic rubber, and other rubber elastomers, clays, quartz sand, corundum, glass or other inorganic minerals or all types of fibers.

In addition, one or more layers, formed from a glass fiber web, a natural fiber web, a glass fiber mat or a natural fiber mat, can be provided in these outer layers or in the composite material itself together with or instead of wood.

According to the invention, the two or more layers of a wood, in particular birch, are bonded with a one-component polyurethane adhesive comprising a prepolymer having free NCO groups.

Preferably, the one-component polyurethane adhesive comprises the prepolymer having free NCO groups in a proportion of up to 99% by weight, the prepolymer being obtainable from at least one component A having a compound reactive toward isocyanates and at least one component B having an isocyanate, from 0.1 to 40% by weight, preferably from 0.1 to 30% by weight, of a filler which comprises at least one fiber and which comprises at least one nonfibrous filler substance in addition to the fiber, from 0 to 20% by weight of customary additives and assistants, from 0 to 20% by weight of an activator, the at least one fiber having a diameter in the range from 5 to 100 µm and a length in the range from 0.02 to 6 mm.

In a further preferred embodiment, a one-component polyurethane adhesive is used without addition of a filler comprising a fiber. In particular, the one-component polyurethane adhesive comprises the prepolymer in a proportion of up to 99.999% by weight, the prepolymer being obtainable from at least one component A having a compound reactive toward isocyanates and at least one component B having an isocyanate, the one-component polyurethane adhesive comprising from 0 to 20% by weight of customary additives and assistants and from 0.001 to 20% by weight of at least one activator selected from one or more of the following substances: 4-methylmorpholine, 4-ethylmorpholine, 4-cyclohexylmorpholine, 2,2'-dimorpholinodiethyl ether or dimorpholinopolyethylene glycol, a) the prepolymer has the following features:
   i) an NCO content of from 5 to 30% by weight, based on the prepolymer
   ii) a viscosity at 25° C. in the range from 300 to 15 000 mPa·s, and
b) the component A has the following features:
   i) the component A comprises at least one diol
   ii) the OH number of the component A is in the range from 10 to 500 KOH/g, the one-component polyurethane adhesive comprising a filler and having a viscosity at 25° C. in the range from 300 to 15 000 mPa·s.

The above preferred one-component polyurethane adhesives are described in EP 1 072 620 and EP 1 072 621.

In the preparation of the prepolymer of the one-component polyurethane adhesive, the components A and B are preferably used in a ratio such that the above-described properties of the prepolymer, in particular the NCO content and the viscosity, are achieved. In addition, assistants and additives or catalysts can be used for the preparation of the prepolymer.

The further starting materials or components for the preparation of the prepolymer composition and adhesive composition are described by way of example below:

Expediently used compounds reactive toward isocyanates, namely component A, may be those having a functionality of from 2 to 8, preferably from 2 to 6, and a molecular weight of from 60 to 10 000, which have hydroxyl, thiol and/or primary and/or secondary amino groups as groups reactive toward isocyanates. For example, polyols selected from the group consisting of the polyetherols and polyesterols, polythioetherpolyols and polyacetals containing hydroxyl groups and aliphatic polycarbonates containing hydroxyl groups, polycarbonatediols and polycaprolactonediols and mixtures of at least two of said polyols have proven useful. Polyesterols and/or polyetherols are preferably used. The hydroxyl number of the polyhydroxy compounds is as a rule from 20 to 850 mg KOH/g and preferably from 25 to 500 mg KOH/g.

As compounds reactive toward isocyanates, it is also possible to use diols and/or triols having molecular weights of from 60 to <400 as chain extenders and/or crosslinking agents in the process according to the invention. For modifying the mechanical properties, for example the hardness, and for increasing the stability of the prepolymer, however, the addition of chain extenders, crosslinking agents or optionally also mixtures thereof may prove to be advantageous. The chain extenders and/or crosslinking agents preferably have a molecular weight of from 60 to 300 g/mol. For example, aliphatic, cycloaliphatic and/or araliphatic diols having 2 to 14, preferably 4 to 10, carbon atoms, e.g. ethylene glycol, 1,3-propanediol, 1,10-decanediol, o-, m- and p-dihydroxycyclohexane, diethylene glycol, dipropylene glycol and preferably 1,4-butanediol, 1,6-hexanediol and bis(2-hydroxyethyl) hydroquinone, triols, such as 1,2,4-, and 1,3,5-trihydroxycyclohexane, glycerol and trimethylolpropane, and low molecular weight polyalkylene oxides containing hydroxyl groups and based on ethylene oxide and/or 1,2-propylene oxide and the abovementioned diols and/or triols are suitable as starter molecules.

As polyol components, it is also possible in general to use highly functional polyols, in particular polyetherols based on highly functional alcohols, sugar alcohols and/or saccharides as starter molecules. Preferably, however, difunctional and/or trifunctional polyetherols or polyesterols based on glycerol and/or trimethylolpropane and/or glycols are used as starter molecules or as alcohols to be esterified. The preparation of the polyetherols is effected by a known technology. Suitable alkylene oxides for the preparation of the polyols are, for example, tetrahydrofuran, ethylene oxide, 1,3-propylene oxide, 1,2- or 2,3-butylene oxide, styrene oxide, preferably ethylene oxide and 1,2-propylene oxide. The alkylene oxides can be used individually, alternately in succession or as mixtures. Polyetherols particularly preferably used in the prepolymer in the adhesive composition according to the invention are those which were alkoxylated with ethylene oxide at the end of the alkoxylation and hence have primary hydroxyl groups.

Examples of suitable starter molecules are: water, glycols, such as ethylene glycol, propylene glycol, 1,4-butanediol and 1,6-hexanediol, amines, such as ethylenediamine, hexamethylenediamine, and 4,4'-diaminodiphenylmethane, and amino alcohols, such as ethanolamine or triethanolamine.

The polyetherols have a functionality of preferably from 2 to 6 and in particular from 2 to 3 and molecular weights of from 400 to 10 000, preferably from 1000 to 7000. The polyetherols can be used alone or as mixtures.

Polycarbonatediols are likewise suitable. Suitable polycarbonatediols are those comprising aromatic dihydroxy compounds, for example based on 4,4'-dihydroxydiphenyl-2,2-propane or those based on aliphatic dihydroxy compounds, e.g. 1,6-hexanediol. The molar masses range from 500 to 4000, preferably from 1000 to 2000.

Suitable polyesterols as the polyol component can be prepared, for example, from organic dicarboxylic acids having 2 to 12 carbon atoms, preferably aliphatic dicarboxylic acids having 4 to 6 carbon atoms, and polyhydric alcohols, preferably diols, having 2 to 12 carbon atoms, preferably 2 to 6 carbon atoms, or by polymerization of lactones having 3 to 20 carbon atoms. Dicarboxylic acids which may be used are, for example, glutaric acid, pimelic acid, suberic acid, sebacic acid, dodecanoic acid and preferably adipic acid, succinic acid and phthalic acid. The dicarboxylic acids can be used individually or as mixtures. For the preparation of the polyesterols, it may be advantageous to use the corresponding acid derivatives, such as carboxylic anhydrides or acyl chlorides, instead of the dicarboxylic acids. Suitable aromatic dicarboxylic acids are terephthalic acid, isophthalic acid or mixtures of these with other dicarboxylic acids, e.g. diphenic acid, sebacic acids, succinic acid and adipic acid. Examples of suitable glycols are diethylene glycol, 1,5-pentanediol, 1,10-decanediol and 2,2,4-trimenthylpentane-1,5-diol. 1,2-Ethanediol, 1,4-butanediol, 1,6-hexanediol and 2,2-dimethylpropane-1,3-diol; 1,4-dimethylolcyclohexane; 1,4-diethanolcyclohexane, ethoxylated/propoxylated products of 2,2-bis(4-hydroxyphenylene)propane (bisphenol A) are preferably used. Depending on the desired properties of the polyurethanes, the polyols can be used alone or as a mixture in different ratios. Suitable lactones for the preparation of the polyesterols are, for example, $\alpha,\alpha$-dimethyl-$\beta$-propiolactone, $\gamma$-butyrolactone and preferably $\epsilon$-caprolactone. The polyesterols preferably have a functionality of from 2 to 4, in particular from 2 to 3, and a molecular weight of from 1200 to 3000, preferably from 1500 to 3000 and in particular from 1500 to 2500.

In particular, polyol mixtures have proven useful for the prepolymer. Such polyol mixtures preferably have at least one diol, preferably polypropylene glycol, and at least one triol, preferably polyethertriol. Particularly suitable diols have an average molecular weight in the range from 500 to 3000, preferably from 700 to 1500 and particularly preferably from 800 to 1500 and over and above this preferably from 800 to 1200. Triols having an average molecular weight of from 1000 to 8000, preferably from 2000 to 6000 and particularly preferably from 3000 to 5000 have proven useful as the triol. It is particularly preferable if the polyol mixture has an OH number in the range from 30 to 140, preferably from 50 to 90 and particularly preferably from 60 to 80 mg KOH/g. The abovementioned diols and triols can be used not only as a polyol mixture but also in each case by themselves for the preparation of the prepolymer.

In another embodiment of the prepolymer, the use of a polyetherpolyol which preferably has primary hydroxyl groups, having an OH number in the range from 10 to 60, preferably from 20 to 40 and particularly preferably from 25 to 35 mg KOH/g, has proven suitable.

If chain extenders, crosslinking agents or mixtures thereof are used for the preparation of the prepolymers, these are expediently used in an amount of from 0 to 20% by weight, preferably from 0.5 to 5% by weight, based on the weight of the compounds used altogether which are reactive toward isocyanates.

Suitable isocyanates or polyisocyanates of component B are the aliphatic, cycloaliphatic, araliphatic and/or aromatic isocyanates known per se, preferably diisocyanates, which, if required, may have been biuretized and/or isocyanurated by generally known methods. The following may be mentioned specifically by way of example: alkylene diisocyanates having 4 to 12 carbon atoms in the alkylene radical, such as dodecane 1,12-diisocyanate, 2-ethyltetramethylene 1,4-diisocyanate, 2-methylpentamethylene 1,5-diisocyanate, tetramethylene 1,4-diisocyanate, lysine ester diisocyanates (LDI), hexamethylene 1,6-diisocyanate (HDI), cyclohexane 1,3- and/or 1,4-diisocyanate, hexahydrotoluene 2,4- and 2,6-diisocyanate and the corresponding isomer mixtures, dicyclohexylmethane 4,4'-,2,2'- and 2,4'-diisocyanate and the corresponding isomer mixtures, 1-isocyanato-3,3,5-trimethyl-5-isocyanatomethylcyclohexane (IPDI), toluene 2,4- and/or 2,6-diisocyanate, diphenylmethane 4,4'-, 2,4' and/or 2,2'-diisocyanate (monomeric MDI), polyphenylpolymethylene polyisocyanates (polymer MDI), and NDI, TODI, PPDI, etc., and/or mixtures comprising at least two of said isocyanates. Di- and/or polyisocyanates comprising ester, urea, allophanate, carbodiimide, uretdione and/or urethane groups may also be used in the process according to the invention.

MDI, such as polymer MDI or preferably monomer MDI, in particular 4,4'-MDI, or mixtures of 2,4'-MDI and 4,4'-MDI, are particularly preferred for the preparation of the prepolymer of the adhesive composition.

In one embodiment, it has proven particularly suitable to use a polymer MDI having an average functionality in the range from 1 to 5, preferably from 1.5 to 4 and particularly preferably from 2 to 3.5 and a viscosity in the range from 100 to 400, preferably from 150 to 300 and particularly preferably from 160 to 260 mPa·s for the prepolymer.

Catalysts which may be used are generally known compounds which greatly accelerate the reaction of isocyanates with the compounds reactive toward isocyanates, a total catalyst content of from 0.01 to 8% by weight, in particular from 0.1 to 5% by weight, based on the weight of the compounds used altogether which are reactive toward isocyanates, being preferably used. For example, the following compounds may be used: triethylamine, tributylamine, dimethylbenzylamine, dicyclohexylmethylamine, dimethylcyclohexylamine, N,N,N',N'-tetramethyldiaminodiethyl ether, bis-(dimethylaminopropyl)urea, N-methyl- or N-ethylmorpholine, N,N'-dimorpholinodiethyl ether (DMDEE), N-cyclohexylmorpholine, N,N,N',N'-tetramethylethylenediamine, N,N,N',N'-tetramethylbutanediamine, N,N,N',N'-tetramethylhexane-1,6-diamine, pentamethyldiethylenetriamine, dimethylpiperazine, N-dimethylaminoethylpiperidine, 1,2-dimethylimidazole, N-hydroxypropylimidazole, 1-azabicyclo[2.2.0]octane, 1,4-diazabicyclo[2.2.2]octane (Dabco) and alkanolamine compounds, such as triethanolamine, triisopropanolamine, N-methyl- and N-ethyldiethanolamine, dimethylaminoethanol, 2-(N,N-dimethylaminoethoxy)ethanol, N,N',N-tris(dialkylaminoalkyl)hexahydrotriazines, e.g. N,N',N-tris(dimethylaminopropyl)-s-hexahydrotriazine, iron(II) chloride, zinc chloride, lead octanoate and preferably tin salts, such as tin dioctanoate, tin diethylhexanoate, dibutyltin dilaurate and/or dibutyldilauryltin mercaptide, 2,3-dimethyl-3,4,5,6-tetrahydropyrimidine, tetraalkylammonium hydroxides, such as tetramethylammonium hydroxide, alkali metal hydroxides, such as sodium hydroxide, alkali metal alcoholates, such as sodium methylate and potassium isopropylate, and/or alkali metal salts of long-chain fatty acids having 10 to 20 carbon atoms and optionally OH side groups. Trimerization catalysts, such as alkali metal or alkaline earth metal acetates, preferably potassium acetate, may furthermore be mentioned. The above catalysts can also be used as an activator in addition to the morpholine derivatives used as activators. Thus, catalysts are incorporated into the prepolymer as such in the preparation thereof and activators with the prepolymer as an additional constituent of the adhesive composition according to the invention are incorporated into said composition. Furthermore, Ti compounds, in particular Ti(IV)-O-alkyl compounds, having alkyl groups such as methyl, ethyl, n-propyl, isopropyl, n-butyl, isobutyl, tert-butyl, n-penty, 2-pentyl, 3-pentyl, preferably ethyl, n-propyl, isopropyl, n-butyl, isobutyl, tert-butyl, and particularly preferably Ti(IV) butylate have furthermore proven useful as catalysts or activators.

If appropriate, further assistants and/or additives may also be added to the reaction mixture for the preparation of the prepolymers. Surface-active substances, stabilizers, cell regulators, dyes, pigments, flameproofing agents, hydrolysis stabilizers, insecticides, fungistatic or bacteriostatic substances may be mentioned by way of example. The surface-active substances and stabilizers counteract "skin formation" of that surface of the adhesive composition which faces the air. Furthermore, the surface-active substances and stabilizers improve the leveling of the adhesive composition and the creepability of the adhesive composition and the devolatilization thereof. Suitable surface-active substances are, for example, compounds which serve for promoting the homogenization of the starting materials. Emulsifiers, such as the sodium salts of castor oil sulfates or of fatty acids or salts of fatty acids with amines, for example of diethylamine with oleic acid, of diethanolamine with stearic acid, and of diethanolamine with ricinoleic acid, salts of sulfonic acids, for example alkali metal or ammonium salts of dodecylbenzene- or dinaphthylmethanedisulfonic acid and ricinoleic acid; stabilizers, such as siloxane-oxyalkylene copolymers and other organopolysiloxanes, oxyethylated alkylphenols, oxyethylated fatty alcohols, liquid paraffins, castor oil esters or ricinoleic acid esters, Turkey red oil and peanut oil, and cell regulators, such as paraffins, fatty alcohols and dimethylpolysiloxanes, may be mentioned by way of example. The above-described oligomeric acrylates having polyoxyalkylene and fluoroalkane radicals as side groups are furthermore suitable for improving the emulsifying effect, the cell structure and/or stabilization of the prepolymer. If foam formation is to be reduced or avoided, trialkyl phosphates are preferred as antifoams. These preferably have alkyl groups, such as methyl, ethyl, n-propyl, isopropyl, n-butyl, isobutyl, tert-butyl, n-pentyl, 2-pentyl, 3-pentyl, preferably ethyl, n-propyl, isopropyl, n-butyl, isobutyl, tert-butyl. The surface-active substances are usually used in amounts of from 0.01 to 5% by weight, based on 100% by weight of the compounds used altogether which are reactive toward isocyanates.

Suitable flameproofing agents are, for example, tricresyl phosphate, tris(2-chloroethyl) phosphate, tris(2-chloropropyl) phosphate, tris(1,3-dichloropropyl) phosphate, tris(2,3-dibromopropyl) phosphate, tetrakis(2-chloroethyl)ethylene diphosphate, dimethylmethane phosphonate, diethyl diethanolaminomethylphosphonate and commercially available halogen-containing flameproofing polyols. In addition to the abovementioned halogen-substituted phosphates, it is also possible to use inorganic or organic flameproofing agents, such as red phosphorus, hydrated aluminum oxide, antimony trioxide, arsenic oxide, ammonium polyphosphate and calcium sulfate, expanded graphite or cyanuric acid derivatives, such as, for example, melamine, or mixtures of at least two flameproofing agents, such as, for example, ammonium polyphosphates and melamine and, if appropriate, corn starch or ammonium polyphosphate, melamine and expanded graphite and/or, if appropriate, aromatic polyesters, for increasing the flame resistance of the prepolymer or adhesive composition. In general, it has proven expedient to use from 5 to 50% by weight, preferably from 5 to 25% by weight, of said flameproofing agents, based on the weight of the compounds used altogether which are reactive toward isocyanates.

In a further preferred embodiment, a one-component polyurethane adhesive which has a filler comprising at least one fiber is used.

The one-component polyurethane adhesive preferably has at least one of the following main features (i) to (iii):
(i) the prepolymer has at least one of the following subfeatures (a) and (b):
  (a) an NCO content of from 5 to 30% by weight, based on the prepolymer,
  (b) a viscosity at 25° C. in the range from 300 to 150 000 mPa·s,
(ii) the component A has at least one of the following subfeatures (c) and (d):
  (c) the component A comprises at least one diol or polyol, preferably one diol or triol and particularly preferably a diol and triol,
  (d) the OH number of the component A is in the range from 10 to 500 mg KOH/g,
(iii) the filler has at least one of the following subfeatures (e) and (f):
  (e) the fiber consists at least one of fiber polymer,
  (f) the filler consists, in addition to the fiber, of at least one nonfibrous filler substance.

The viscosity at 25° C. of the prepolymer is preferably in a range from 300 to 15 000, preferably from 500 to 10 000 mPa·s if the adhesive composition is to be pumpable. If on the other hand it is intended to use the adhesive composition as a pasty, trowelable material, the viscosity at 25° C. of the prepolymer is preferably in the range from >15 000 to 150 000 and particularly preferably in the range from 20 000 to 100 000 mPa·s.

Furthermore, it is preferable if the adhesive composition has a low solvent content. This is the case when the amount of solvent present in the adhesive composition is <10, preferably <5 and particularly preferably <2% by weight. According to the invention, solvents are organic and inorganic liquids which are suitable as a vehicle for the other constituents of the adhesive composition and do not harden with at least a part of the other constituents.

Preferably, the adhesive composition is solvent-free.

In an advantageous embodiment of the adhesive composition, both the abovementioned main feature of the prepolymer (i) and the main feature (ii) of the component A are realized.

In another embodiment of the adhesive composition, the main feature (ii) of the component A and the main feature of the filler (iii) are fulfilled.

In another embodiment of the adhesive composition, all three main features (i) to (iii) are fulfilled.

Preferred embodiments of the adhesive composition are those in which in each case both subfeatures (a) and (b) or (c) and (d) or (e) and (f) are fulfilled in the case of the prepolymer, of component A and of the filler.

In another preferred embodiment of the adhesive composition, both all main features (i) to (iii) and all subfeatures (a) to (f) are fulfilled.

In a further embodiment of the adhesive composition, at least one of the features (iv) and (v) is fulfilled in addition to the features (i) to (iii):
  (iv) the fiber polymer is at least one polyamide,
  (v) the filler substance consists of at least one inorganic material.

It is preferable if the fiber polymers of the adhesive composition are formed predominantly from organic or inorganic materials. Suitable organic materials for fiber polymers are in particular polycondensates and polyaddition polymers which are preferably not polyurethane, polycondensates being preferred. Particularly suitable polycondensates are polycarbonates, polyesters, polyamides, polyimides and melamine-formaldehyde resin.

Polyaddition polymers are in particular polyacrylates, polymethacrylates, polystyrenes, polyacrylonitriles, polyethylene, polypropylene, polyvinyl alcohol and the copolymers of at least two monomers of the abovementioned homopolymers and blends of at least two thereof.

It is particularly preferable if a polyamide is used as the fiber polymer in the adhesive composition. All commercially available polyamides known to the person skilled in the art are suitable for this purpose. However, polyamides such as nylon, in particular nylon-6,6 or nylon-6, and polyaramides have proven particularly useful.

Furthermore, the fibers may be based on or consist of natural organic fiber polymers, for example cellulose, cotton, jute, viscose and sisal. In addition, the fibers may also be formed from inorganic materials. Preferred inorganic fiber polymers are carbon, glass and mineral wool fibers. Furthermore, it is possible for the fibers to be obtained from different materials, for example by spinning.

The fibers used preferably have a diameter in the range from 5 to 100, preferably from 10 to 60 and particularly preferably from 10 to 30 µm and a length in the range from 0.02 to 6, preferably from 0.05 to 4 and particularly preferably from 0.1 to 2 mm.

In addition, the adhesive composition has a nonfibrous filler substance which consists of at least one inorganic material. In principle, all inorganic materials known to the person skilled in the art and in particular the commercially available inorganic materials, which are present as a solid, are suitable for the adhesive according to the invention. The inorganic materials must be present as a solid in particular in the temperature range in which the adhesive composition according to the invention is processed and the adhesively bonded article is subsequently used. This temperature range preferably begins at −50 and extends up to +160° C.

The oxygen compounds of silicon or of aluminum or of magnesium or at least two thereof, which moreover optionally have further elements, have proven to be particularly suitable inorganic materials. Silicates and aluminum oxides, for example clays, such as china clay, and quartz compounds or silicic acid are particularly suitable.

The nonfibrous filler substances are preferably particulate. 80% of the particulate filler substances have a particle size in the range from 0.01 to 50, preferably from 0.1 to 10 and particularly preferably from 0.2 to 8 µm.

The filler used according to the invention may comprise fibers or additionally filler substances. If the filler has both fibers and filler substances, it is preferable if at least just as much filler substances as fibers, preferably filler substances in excess, are present in the filler.

Fillers are present in the adhesive composition in particular to improve the physical properties thereof for the various uses. For this purpose, the adhesive composition must form a bubble-free adhesive layer which is as compact as possible after curing and the joints between the substrates must be filled as completely as possible. In order to increase the adhesion, the adhesive composition should partly penetrate into the substrate surface. However, after curing of the adhesive composition to give the adhesive, this penetration or shrinkage should not result in any cavities which might adversely affect the cohesion. Particularly in thicker joints, in the range of from greater than 0.1 to 1 mm, preferably from 0.2 to 1 mm, these requirements can be particularly readily met by incorporating fillers in the composition described above into the adhesive composition.

In the case of the fillers present in the adhesive compositions, it has proven particularly useful if they have a water content of less than 5, preferably less than 1 and particularly preferably less than 0.1% by weight, based on the filler. This is advantageous in particular with regard to the preparation of the adhesive composition according to the invention.

The activator of the adhesive composition consists at least of one morpholine derivative. Particularly suitable morpholine derivatives are 4-methylmorpholine, 4-ethylmorpholine, 4-cyclohexylmorpholine, 2,2'-dimorpholinodiethyl ether or dimorpholinopolyethylene glycol, or at least two thereof. Furthermore, further compounds having an activating effect, as described, for example, as polyurethane catalysts in Becker/Braun, Kunststoffhandbuch 7 (1993), can be used in addition to the morpholine derivative, the proportion of the morpholine derivatives preferably predominating.

Thixotropic assistants have proven advantageous, in particular with regard to the shelf-life. Particularly preferred thixotropic assistants are bentonites, kaolins, alginic acid and silicic acid, the silicic acid being particularly preferred. In addition to or instead of the abovementioned thixotropic assistants consisting of solids, soluble thixotropic assistants which can be obtained, for example, via the reaction of an isocyanate in the presence of amines, as described in the publications EP 300 388 A1, DD 156 480, DD 211 689, DD 211 930 and DD 211 931, are preferred.

Thixotropic assistants are small-particled substances which thicken liquids even when they are added and release small amounts to the liquid, for example up to not more than 10-% by weight, based on the liquid. These small particles preferably have on their surface silano groups which interact with the liquid with which they are dispersed, with formation of hydrogen bridge bonds, and thus lead to thickening of this liquid. Typical of thixotropic assistants is that, with the same amount, the thickening effect increases with decreasing particle size on appropriately careful dispersing by vigorous mixing. Furthermore, the thixotropic assistants have the advantage that they do not settle out in the dispersed liquid. Moreover, the thixotropic assistants prevent or delay the settling out of fillers. Preferred materials for thixotropic assistants are montmorillonite, Mg/Al silicate, Al/Na silicate, bentonites, hectorite, Na/Mg silicate, pyrogenic silicas, hydrated silicas, hornblende-chrysotile, chrysotile-asbestos, chrysotile-silicic acid and precipitated MgO in fine powder form, pyrogenic silicas, for example obtainable as Aerosil from Degussa-Hüls AG, and magnesium silicates, obtainable as Bentone from Kronos Titan GmbH Leverkusen, being preferred and Aerosil being particularly preferred.

The invention claimed is:

1. A composite material, comprising:
    two or more layers of a wood which are arranged one on top of the other,
    wherein the layers are bonded to one another with a one-component polyurethane adhesive comprising a prepolymer comprising a free NCO group, and
    wherein the wood has a proportion by volume of libriform fibers in a range from 50 to 70%.

2. The material of claim 1, wherein the wood is birchwood.

3. The material of claim 1, wherein the wood is aspen, eucalyptus, rubber tree, silk tree, cotton tree, acacia, or poplar.

4. The material of claim 1, wherein the one-component polyurethane adhesive comprises:
    the prepolymer in a proportion of up to 99.9% by weight, wherein the prepolymer is obtained from at least one component (A) comprising a compound reactive toward an isocyanate and at least one component (B) comprising an isocyanate;
    from 0.1 to 20% by weight of a filler which comprises a fiber and a nonfibrous filler substance in addition to the fiber;
    from 0 to 20% by weight of at least one selected from the group consisting of a customary additive and an assistant; and
    from 0 to 10% by weight of an activator,
    wherein the fiber has a diameter in a range from 5 to 100 µm and a length in a range from 0.02 to 6 mm.

5. The material of claim 1, wherein the one-component polyurethane adhesive comprises:
    the prepolymer in a proportion of up to 99.999% by weight, wherein the prepolymer is obtained from at least one component (A) comprising a compound reactive toward an isocyanate and at least one component (B) comprising an isocyanate;

from 0 to 20% by weight of at least one selected from the group consisting of a customary additive and an assistant; and from 0.001 to 20% by weight of at least one activator selected from the group consisting of 4-methylmorpholine, 4-ethylmorpholine, 4-cyclohexylmorpholine, 2,2'-dimorpholinodiethyl ether, and dimorpholinopolyethylene glycol, wherein a) the prepolymer has:
   i) an NCO content of from 5 to 30% by weight, based on the prepolymer; and
   ii) a viscosity at 25° C. in a range from 300 to 15 000 mPa·s, and b) the component (A):
   i) comprises at least one diol; and
   ii) has an OH number in a range from 10 to 500 KOH/g, and wherein the one-component polyurethane adhesive comprises a filler and has a viscosity at 25° C. in a range from 300 to 15 000 mPa·s.

6. The material of claim 5, wherein the activator comprises 4-methylmorpholine.

7. The material of claim 5, wherein the activator comprises 4-ethylmorpholine.

8. The material of claim 5, wherein the activator comprises 4-cyclohexylmorpholine.

9. The material of claim 5, wherein the activator comprises 2,2'-dimorpholinodiethyl ether.

10. The material of claim 5, wherein the activator comprises dimorpholinopolyethylene glycol.

11. The material of claim 1, further comprising:
a plastic layer.

12. The material of claim 11, wherein the plastic layer comprises a polyurethane/polyurea layer.

13. The material of claim 1, further comprising:
a layer comprising a glass fiber web, a natural fiber web, a glass fiber mat, or a natural fiber mat.

14. The material of claim 1, further comprising:
a layer comprising a glass fiber web.

15. The material of claim 14, further comprising:
a plastic layer.

16. The material of claim 1, further comprising:
a layer comprising a natural fiber web.

17. The material of claim 16, further comprising:
a plastic layer.

18. The material of claim 1, further comprising:
a layer comprising a glass fiber mat.

19. The material of claim 18, further comprising:
a plastic layer.

20. The material of claim 1, further comprising:
a layer comprising a natural fiber mat.

* * * * *